United States Patent
Appel et al.

(10) Patent No.: US 9,710,470 B2
(45) Date of Patent: Jul. 18, 2017

(54) SOCIAL RECOMMENDATION ACROSS HETEROGENEOUS NETWORKS

(71) Applicant: International Business Machines Corporation, Armonk, NY (US)

(72) Inventors: Ana Paula Appel, São Paulo (BR); Maira Athanazio De Cerqueira Gatti, Rio de Janeiro (BR); Rogerio Abreu De Paula, Sao Paulo (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 148 days.

(21) Appl. No.: 14/021,776

(22) Filed: Sep. 9, 2013

(65) Prior Publication Data

US 2015/0074122 A1  Mar. 12, 2015

(51) Int. Cl.
G06F 7/02 (2006.01)
G06F 17/30 (2006.01)
G06Q 50/00 (2012.01)

(52) U.S. Cl.
CPC .... G06F 17/30029 (2013.01); G06F 17/3053 (2013.01); G06F 17/30867 (2013.01); G06Q 50/01 (2013.01)

(58) Field of Classification Search
CPC .............. G06Q 50/01; G06F 17/30867; G06F 17/3053; G06F 17/30
See application file for complete search history.

(56) References Cited

U.S. PATENT DOCUMENTS

| 8,019,875 | B1 | 9/2011 | Nielsen |
| 2002/0147710 | A1 | 10/2002 | Hu |
| 2008/0005073 | A1* | 1/2008 | Meek ................ G06F 17/30867 |
| 2010/0010860 | A1 | 1/2010 | Bose |
| 2012/0151383 | A1* | 6/2012 | Kazan ................. G06Q 10/101 |
| | | | 715/753 |
| 2014/0156451 | A1* | 6/2014 | Goldman ........... G06Q 30/0631 |
| | | | 705/26.8 |
| 2014/0214960 | A1* | 7/2014 | Allen ...................... H04L 67/22 |
| | | | 709/204 |

(Continued)

OTHER PUBLICATIONS

Muhammad Aurangzeb Ahmad, Zoheb Borbora, Jaideep Srivastava, and Noshir Contractor. 2010. Link Prediction Across Multiple Social Networks. In Proceedings of the 2010 IEEE International Conference on Data Mining Workshops (ICDMW '10). IEEE Computer Society, Washington, DC, USA, 911-918. DOI=10.1109/ICDMW.2010.79 http://dx.doi.org/10.1109/ICDMW.2010.79.

(Continued)

*Primary Examiner* — Bruce Moser
(74) *Attorney, Agent, or Firm* — Louis J. Percello; Otterstedt, Ellenbogen & Kammer, LLP

(57) ABSTRACT

At least one computer processor obtains access to a relationship network and a network of a different kind than the relationship network. The at least one computer processor also obtains a user query and carries out a multiple heterogeneous networks search on the relationship network and the network of the different kind than the relationship network, by executing on the at least one computer processor a multiple heterogeneous network search module, to obtain a ranked output list responsive to the user query.

16 Claims, 6 Drawing Sheets

(56) References Cited

U.S. PATENT DOCUMENTS

| | | | | |
|---|---|---|---|---|
| 2014/0330914 A1* | 11/2014 | Dasgupta | ............... | H04L 51/32 |
| | | | | 709/206 |
| 2015/0127628 A1* | 5/2015 | Rathod | ............... | 707/710 |
| 2015/0278960 A1* | 10/2015 | Moore | ............... | G06Q 50/01 |
| | | | | 705/319 |
| 2016/0070954 A1* | 3/2016 | Barak | ............... | H04L 67/22 |
| | | | | 382/118 |
| 2017/0039197 A1* | 2/2017 | Raina | ............... | G06Q 30/02 |

OTHER PUBLICATIONS

H. Liu, P. Maes, Interestmap: Harvesting social network profiles for recommendations, In Proceedings of the Beyond Personalization 2005 Workshop (2005).

"Cosine similarity" downloaded from http://en.wikipedia.org/wiki/Cosine_similarity on Mar. 2, 2013.

Neal Lathia, Stephen Hailes, and Licia Capra. 2008. kNN CF: a temporal social network. In Proceedings of the 2008 ACM conference on Recommender systems (RecSys '08). ACM, New York, NY, USA, 227-234. DOI=10.1145/1454008.1454044 http://doi.acm.org/10.1145/1454008.1454044 (2008).

Kazienko P., Musial K., Kajdanowicz T.: Multidimensional Social Network in the Social Recommender System. IEEE Transactions on Systems, Man, and Cybernetics—Part A: Systems and Humans, vol. 41, Issue 4, 2011, pp. 746-759.

\* cited by examiner

SOCIAL RECOMMENDATION ACROSS HETEROGENEOUS NETWORKS

STATEMENT OF GOVERNMENT RIGHTS

Not Applicable.

CROSS-REFERENCE TO RELATED APPLICATIONS

Not Applicable.

FIELD OF THE INVENTION

The present invention relates to the electrical, electronic, information technology, and computer arts, and, more particularly, to knowledge management and the like.

BACKGROUND OF THE INVENTION

The analysis of social networks has become a prominent technique for finding and disseminating information and resources (i.e. those who know things and those who do things). A large number of computer systems and computational and/or mathematical methods have been developed to date to map out, traverse, and identify information and/or resources on people's social networks. Also, a number of systems, also known as social network systems, have been developed to allow people to build and maintain their social networks for various reasons, ranging from socializing to job-hunting to information sharing.

SUMMARY OF THE INVENTION

Principles of the invention provide techniques for social recommendation across heterogeneous networks. In one aspect, an exemplary method includes the step of obtaining access, by at least one computer processor, to a relationship network; obtaining access, by the at least one computer processor, to a network of a different kind than the relationship network; obtaining, by the at least one computer processor, a user query; and carrying out a multiple heterogeneous networks search on the relationship network and the network of the different kind than the relationship network, by executing on the at least one computer processor a multiple heterogeneous network search module, to obtain a ranked output list responsive to the user query.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein; the means exclude transmission media per se and disembodied signals per se.

Techniques of the present invention can provide substantial beneficial technical effects. For example, one or more embodiments may provide one or more of the following advantages:

A system to identify and recommend people with more accuracy for a multitude of purposes, such as, identifying an individual with similar skills (or, for that matter, taste, interests, aptitudes, and the like) based on the computational analyses of multiple kinds of networks (pre-established or inferred) or one network with multiple edges, each edge representing a particular information source or attribute.

This approach outperforms existing ones for identifying and recommending people for various types of tasks and reasons by leveraging the analyses of multiple networks concomitantly. Greater accuracy in identifying and recommending people stems from making use of multiple network sources—from individual's social networks (professional or other) to networks inferred from electronic data captured from people's everyday activities.

One or more embodiments provide a ranked output list which is improved as compared to querying only a single (social or other) network.

These and other features and advantages of the present invention will become apparent from the following detailed description of illustrative embodiments thereof, which is to be read in connection with the accompanying drawings.

DETAILED DESCRIPTION OF PREFERRED EMBODIMENTS

Figure 1:
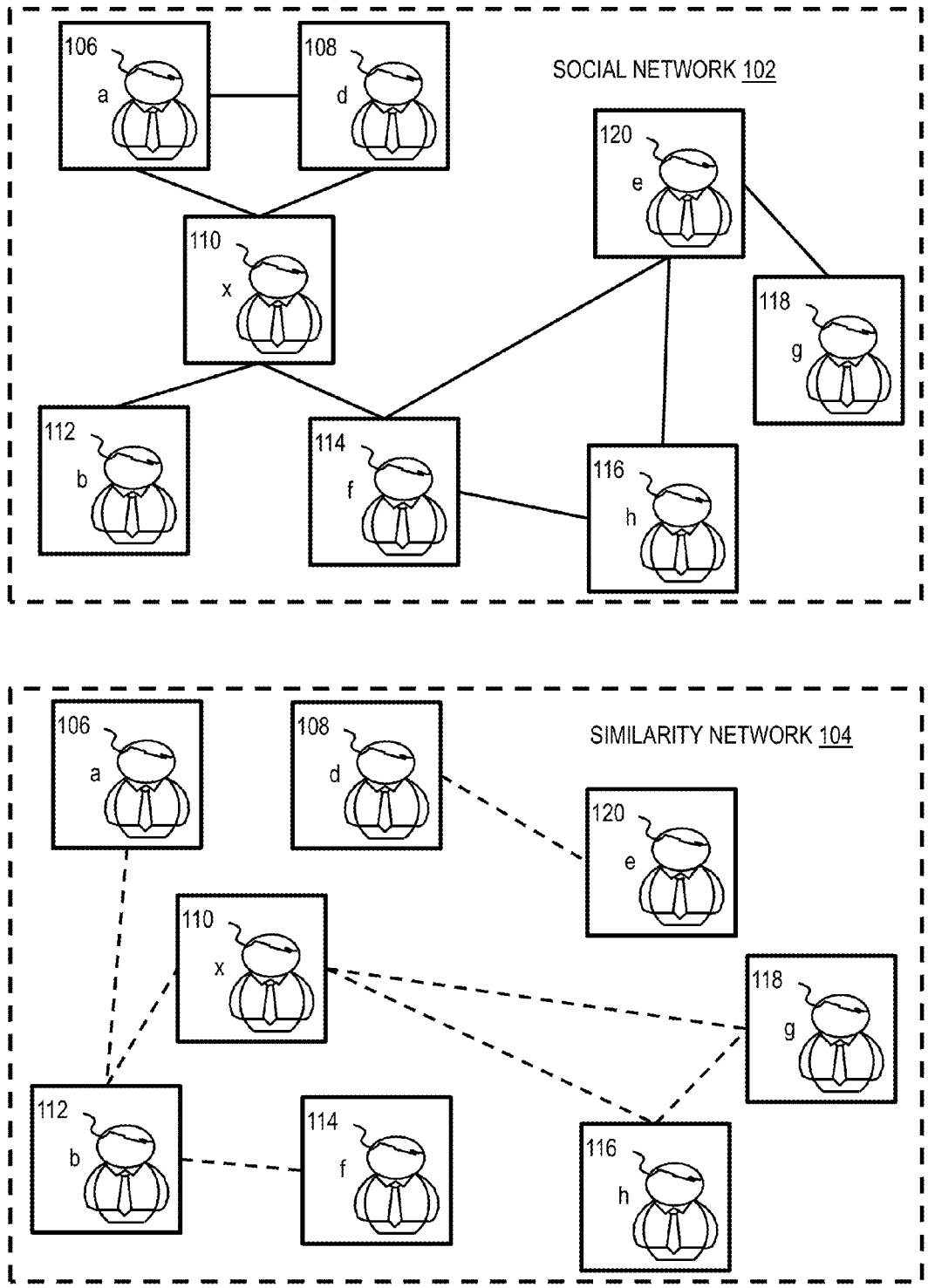
FIG. 1 shows non-limiting examples of social and similarity networks, with which one or more embodiments of the invention can be employed.

As noted, the analysis of social networks has become a prominent technique for finding and disseminating information and resources (i.e. those who know things and those who do things). A large number of computer systems and computational and/or mathematical methods have been developed to date to map out, traverse, and identify information and/or resources on people's social networks. Also, a number of systems, also known as social network systems, have been developed to allow people to build and maintain their social networks for various reasons, ranging from socializing to job hunting to information sharing.

In the context of work settings, there is an increased interest in harnessing the power of social networks to help workers carry out their work more effectively and more efficiently. Enterprise social network solutions have become a significant business for many organizations.

Two basic premises lie at the heart of these systems: (1) knowing who to ask, or indeed simply knowing someone, facilitates everyday work tasks, and (2) if one does not know who (to ask or otherwise), it is likely that someone else "knows who knows" (e.g. a friend of a friend). Hence, these systems employ a multitude of computational and mathematical methods for calculating and inferring, for instance, information related to a particular individual based on his or her social network. In so doing, individuals are capable of suggesting, for example, other individuals whom they might be interested in inviting to their social networks; products that they might be interested in purchasing based on prior decisions of their friends; co-workers to whom one might direct requests for support; and the like.

Other types of networks (or graphs) can be also built by computing and/or calculating the degree of relatedness of two entities (be these entities individuals or objects). For instance, a skill network is a graph including individuals who are connected to others (according to various types of topologies and configurations) based on the similarity of their skill sets. A similarity function computes the similarity metric among individuals, hence building the skill-based network; one non-limiting example is given in Neal Lathia et al., "kNN CF: A Temporal Social Network," in Proceedings of the 2008 ACM conference on Recommender systems (RecSys '08), ACM, New York, N.Y., USA, 227-234, 2008, expressly incorporated herein by reference in its entirety for all purposes. Similarity functions in general are well-known to the skilled artisan; given the teachings herein, the skilled artisan will be able to use the similarity function from the Lathia paper, or one or more different functions, to generate a similarity network.

Significantly, current systems refer to and rely on information from a specific type of network. Hence, these systems are limited with regard to the information that can be computed and inferred from the node and link information pertaining to that particular type of network. That is to say, systems today use one type of network, for example social, work, etc.; one or more embodiments combine different networks.

Advantageously, one or more embodiments integrate and analyze heterogeneous networks to more effectively recommend an enhanced, or even optimal, solution for a particular search problem. That is, one or more embodiments provide a system that makes use of complementary information from heterogeneous networks to find the optimal (or sub-optimal) solution for a problem (be it simply a query or otherwise).

In one or more embodiments, given at least two networks (e.g., one social network and one similarity network, which could be based on skills or other features), a method and system are provided to generate a recommendation including a ranked list of individuals, based on the "more available" similar individuals constrained by the shortest connectivity degree.

FIG. 1 shows non-limiting examples of social and similarity networks, 102, 104, with which one or more embodiments of the invention can be employed. The social network 102 shows the friendship among a set of individuals, namely, individual a, numbered 106; individual d, numbered 108; individual x, numbered 110; individual b, numbered 112; individual f, numbered 114; individual h, numbered 116; individual g, numbered 118; and individual c, numbered 120. The similarity network 104 shows the similarity, among the same set of individuals that solved the same problem, using a set of features. Suppose that individual x 110 needs to ask for information from someone. He or she always asks individual b 112 since they are friends. However, if individual b 112 is not available, the most preferred person to approach is individual g 118 or individual h 116. Thus, this method will indicate that individual b 112 should connect with individual h 116 before individual g 118 since individual h 116 is closer (by "closer," as used herein, it is meant that the path between the two nodes is shorter than other paths, e.g., the number of edges between two nodes as their distance) in the social network 102 than individual g 118 (3 edges).

Figure 2:
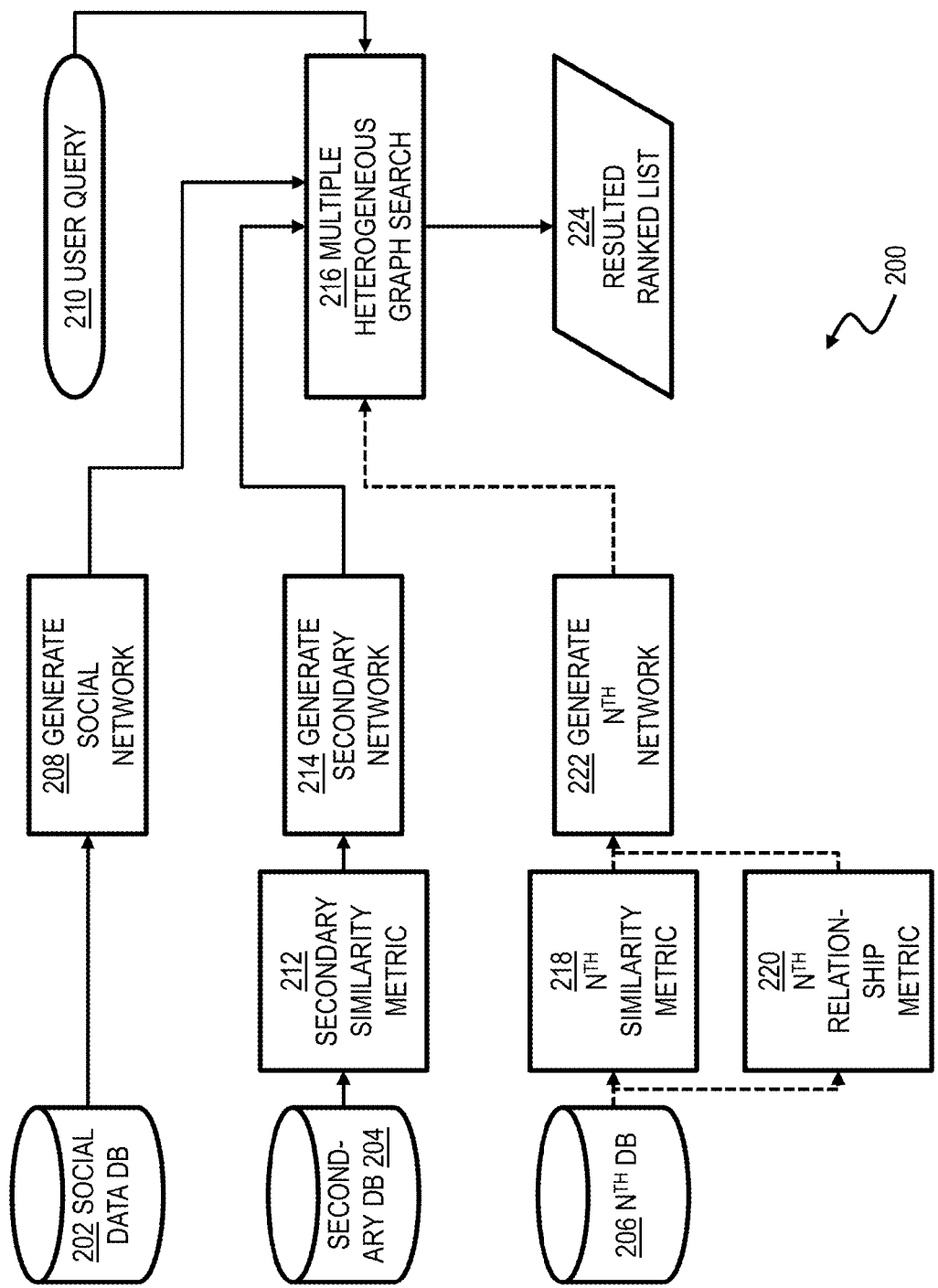
FIG. 2 shows an exemplary workflow, in accordance with an aspect of the invention.

Reference should now be had to flow chart 200 of FIG. 2. The general method presented in the FIG. 2 works as follows. In step 208, use social data from social data database 202 to build a social network (i.e., to generate social network activity), for example friendship, co-working, etc. (i.e., the people know each other and have some relationship). In step 214, use other data (extracted features 212 from at least one secondary database 204) to generate a network based on similarity to build a similarity network. With regard to "second similarity metric" 212, consider a network based on similar characteristics, for example, working in the same field, solving similar problems, similar tastes and/or traits. This indirect and/or inferred relationship (not implying that they know each other) is calculated by similarity functions.

In step 222, use relational or extracted features from any other data set 206 to build other networks, if any. The Nth similarity metric 218 is an example of extracted features. The Nth relationship metric 220 is an example of relational features. A relationship metric is any metric or function that can be used to compute a degree of relationship between two persons—namely, how similar they are in a particular manner.

In step 210, a user submits a query about a person. In step 216, using multiple heterogeneous graph search activity, combine all the networks (208, 214, . . . 222) to rank a set of individuals, obtaining resulted ranked list output 224.

Note that a user query could be directly or indirectly generated by an actual 'user' (human being); an example of indirect generation includes generation by a computer program. Furthermore, the query on the social network (or other network) is not necessarily just on the user's own networks (the one who initiated the query) but also on others' networks (third parties). For example, on the one hand, someone might be looking for an expert who he or she can ask for questions (where the similarity is a matching of expertise level or otherwise) but who is near him or her in his or her own social network—so it would be easier for him or her, say, to get introduced to this person. On the other, someone might be looking for a person as a backup of another to carry out a task. In this case he or she might access someone else's social network and/or other kind of network. As noted elsewhere herein, it is recommended that access to social networks be undertaken only when the individual in question (in this case, the "someone else") has opted in to participation, or alternatively, has been afforded an opportunity to opt out and has chosen not to opt out.

Figure 3:
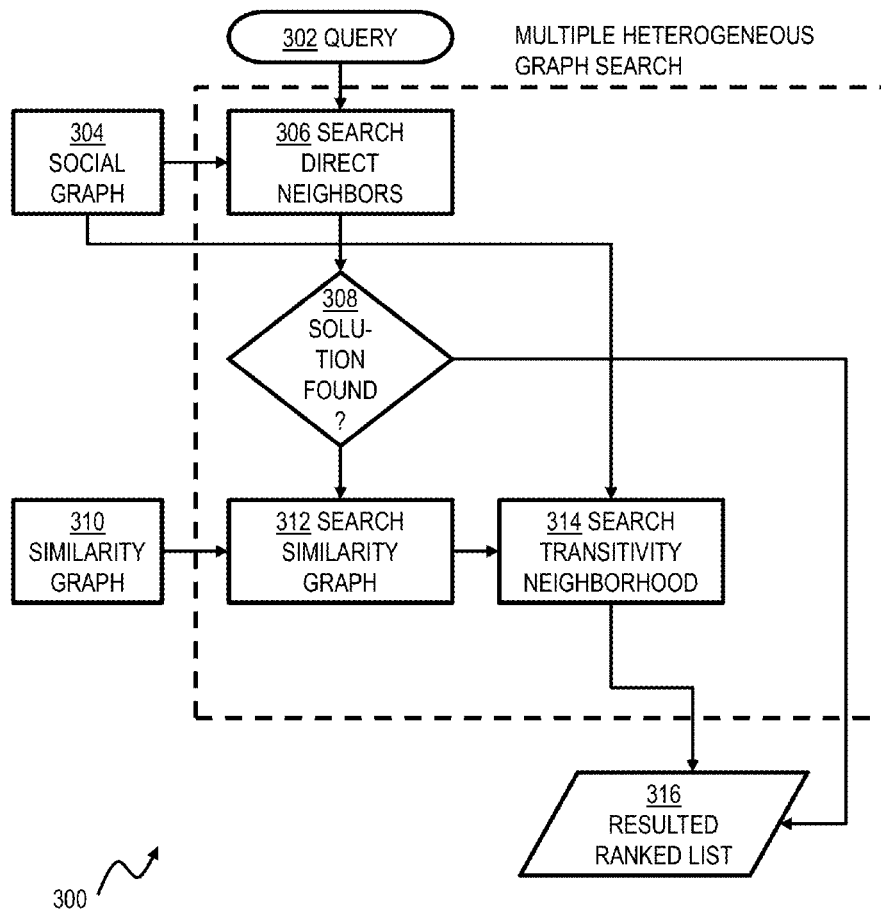
FIG. 3 shows at least a portion of an exemplary multiple heterogeneous graph search, in accordance with an aspect of the invention.

Flow chart 300 of FIG. 3 provides exemplary details for carrying out multiple heterogeneous graph search activity 216. Query 302 corresponds to query 210 of FIG. 2. Social graph 304 represents the social network generated in step

208. Similarity graph 310 represents one or more of the networks 214, ... 222. In step 306, look at the direct neighborhood of the node queried. In decision block 308, if an available person is found, as per the "Y" branch, the method is finished and the resulted ranked list 316 is output. Resulted ranked list 316 corresponds to resulted ranked list 224.

On the other hand, if, in decision block 308, an available person is not found, as per the "N" branch, check the similarity graph 310 in step 312; in particular, look in the similarity graph 310 for a similar person. Then, in step 314, look in the social network in the extended neighborhood of the node (more than 1 edge/hop distance), to rank the closest person. That is to say, it is desired to rank those who are the closest individuals in one network to make a recommendation in another. The result is the ranked list 316.

One non-limiting exemplary application for this method is the recommendation of social interaction(s) among technicians or system administrators (SAs) that usually solve same kind of problem(s).

Figure 4A:
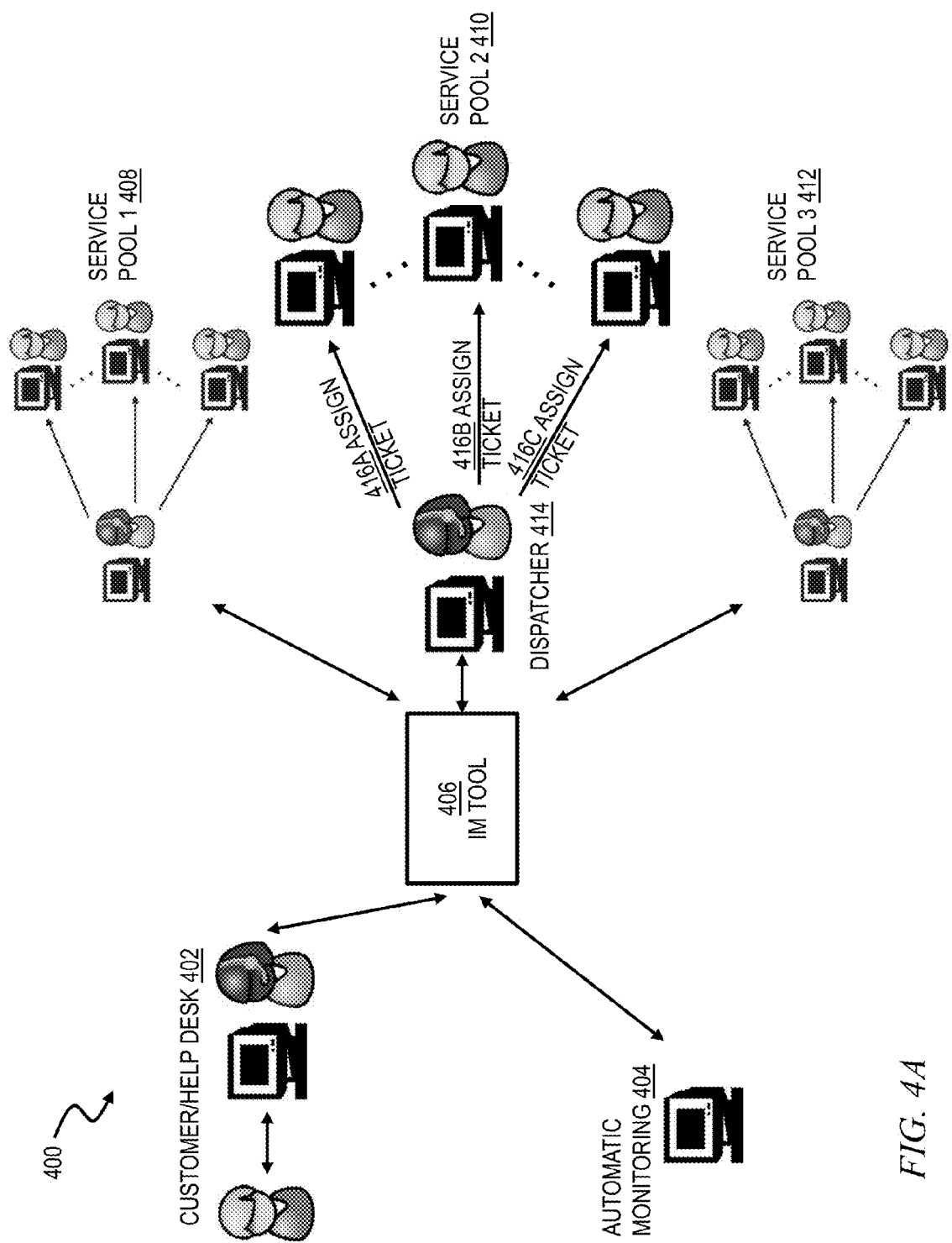
FIGS. 4A and 4B show an exemplary application and output, in accordance with an aspect of the invention.
Figure 4B:
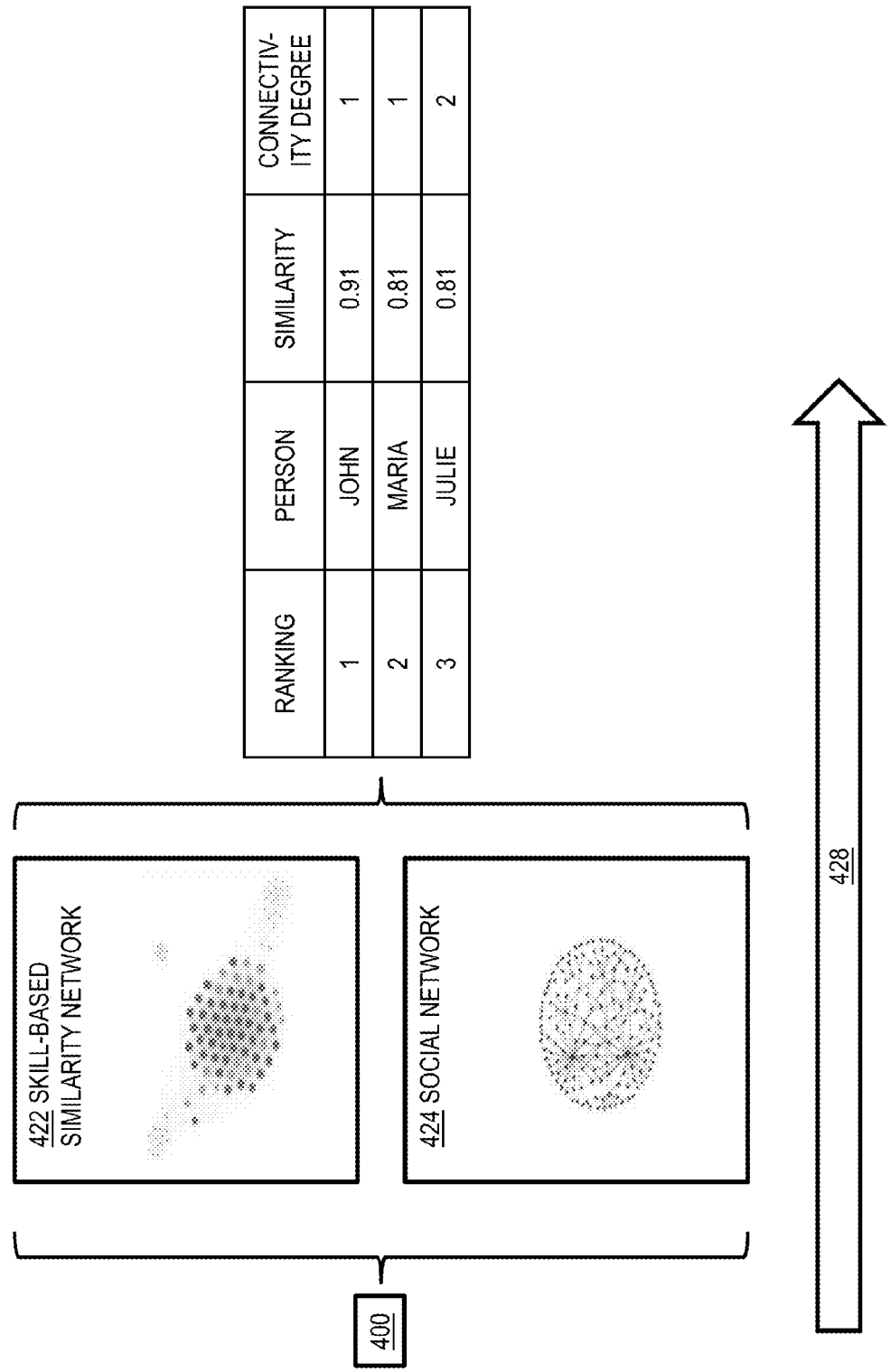

For instance, FIGS. 4A and 4B show this kind of situation. Referring initially to view 400 in FIG. 4A, suppose that a given set of system administrators addresses services requests generated through an incident management system tool (IM Tool) 406 from a client application, and consider the system administrators' social network 424 in FIG. 4B and the data set which contains their skills. This data set may reside, for example, inside a company (database and internal systems) and all over the World Wide Web. The services requests may arise, for example, from a customer interacting with help desk 402 or automated monitoring 404.

In a non-limiting example, the system administrators work in a number of service pools; e.g., a first service pool numbered 408; a second service pool numbered 410; and a third service pool numbered 412. A dispatcher 414 may assign tickets to individual system administrators within a service pool, as shown with respect to the second service pool 410 at 416A, 416B, and 416C. The dispatcher and assignments are not separately numbered with respect to the other service pools to avoid cluttering the figure.

The skill data set is converted to a skill network 422 in FIG. 4B, using an appropriate similarity function that uses a distance function (for example cosine, Euclidian, or the like). Furthermore in this regard, the skilled artisan will be familiar with similarity functions per se and, given the teachings herein, will be able to employ one or more known similarity functions to implement one or more embodiments of the invention. For example, the skilled artisan will appreciate that cosine similarity is a measure of similarity between two vectors of an inner product space, which measures the cosine of the angle between the two vectors. The cosine of zero is one, and less than one for any other angle. The lowest value of the cosine is negative one. The cosine of the angle between the two vectors thus determines whether the two vectors are pointing in roughly the same direction. Cosine similarity is a non-limiting example; one or more embodiments can be used with any similarity function, not only cosine. Euclidean distance or Euclidean metric is ordinarily used to measure distance between two points, one that be would measured with the aid of a ruler.

Thus, there are two networks 422, 424 pertaining to the system administrators. As indicated by arrow 428, given a specific SA as a query, the method outputs a ranked list 426 of other SAs that are similar to the queried SA and are not in his or her direct social circle. In one or more embodiments, the closeness of people in the queried SA's social circle is used as an attribute to sort the ranked list (connectivity degree, which is the distance from the queried SA based on the number of hops of his or her neighbors). List 426 is one particular example of lists 224, 316. List 426 includes ranking in the first column, the name of the SA in the second column, the similarity score in the third column, and the connectivity degree in the fourth column.

Thus, some embodiments provide a system for querying and/or searching two or more different kinds of networks. In one or more embodiments, one of the networks is a social network; by social, it is meant that the nodes represent people with some sorts of relationships among each other. Otherwise, the network might represent different kinds of relatedness or attributes that create similarity among individuals (other forms of relationship, implicit and/or inferred or otherwise. The system includes a computer such as that shown in FIG. 5 and discussed below. The system also includes a first search function that performs a first search of a first (social) network (e.g., 102, result of 208, 304, 424). The first (social) network is defined by a first set of connecting edges (e.g., lines between individuals in FIG. 1 view 102) that show a first degree of relationship between a plurality of first contact nodes (e.g., individuals in FIG. 1 view 102). The edges in the first set of connecting edges are defined by a first set of attributes; for example, an attribute (characteristic) could be "work together," "write a document together," etc. The first search returns a first hit list of first contact nodes.

The system further includes a second search function that performs one or more second searches on one or more respective second networks (e.g., 104, result of 214 ... 222, 310, 422). Each of the second networks is defined by a respective second set of connecting edges (e.g., lines between individuals in FIG. 1 view 104) that show a second degree of relationship between a plurality of second contact nodes in the respective second network (e.g., individuals in FIG. 1 view 104). Each of the second sets of connecting edges is defined by a respective second set of attributes, for example an attribute (characteristic) could be "work together," "write a document together," etc. Each of the second search functions returns a respective second hit list of respective second contact nodes.

The system still further includes a combination function (e.g., 216; 300) that combines the first hit list and one or more of the second hit lists into a final hit list 224, 316, 426. The final hit list contains a plurality of first or second contact nodes that are related by the first set of attributes and the second sets of attributes within a degree of relationship.

In some cases, the first hit list is used as the set of second contact nodes from which one or more of the second social networks are formed so that the final hit list is the same as the second hit list.

In some cases, the first hit list and one or more of the second hit lists are logically intersected.

In some cases, the first set of attributes defines the first set of connecting edges with a professional qualification first degree of relationship and the second set of attributes define the second set of connecting edges with a second degree of relationship, such as geographic, social, or the like. It is noted that "first" and "second" are somewhat arbitrary; however, professional qualification would typically be a relationship in the similarity network.

In some cases, the first set of attributes define the first set of connecting edges with a commercial service and/or product received first degree of relationship and the second set of attributes define the second set of connecting edges with a second degree of relationship, such as geographic, social, or the like. In some cases, the first set of attributes define the first set of connecting edges with a hobby and/or personal interest first degree of relationship and the second set of attributes define the second set of connecting edges with a second degree of relationship, such as geographic, social, or the like. Again, note that "first" and "second" are somewhat arbitrary.

It is recommended that access to social networks be undertaken only when the individual in question has opted in to participation, or alternatively, has been afforded an opportunity to opt out and has chosen not to opt out.

In a non-limiting example, the first and/or second contact nodes represent one or more of the following: an individual, a corporation, an interest group, a service provider, and the like.

Given the discussion thus far, it will be appreciated that, in general terms, an exemplary method, according to an aspect of the invention, includes the step of obtaining access, by at least one computer processor 502, to a relationship network (e.g. 102, result of 208, 304, 424). A relationship network includes a social network or other network based on a relationship such as co-authoring, co-workings, etc.; that is to say, the people in the network know each other. Another step includes obtaining access, by the at least one computer processor 502, to a network of a different kind than the relationship network (e.g., 104, result of 214 . . . 222, 310, 422). These two steps can be carried out, for example, with a network access module 520, discussed further below, executing on the at least one computer processor. A still further step 210, 302 includes obtaining, by the at least one computer processor 502, a user query. This step can be carried out, for example, with a user interface module 522, discussed further below, executing on the at least one computer processor. An even further step 216, 300 includes carrying out a multiple heterogeneous networks search on the relationship network and the network of the different kind than the relationship network, by executing on the at least one computer processor a multiple heterogeneous network search module 524, discussed further below, to obtain a ranked output list responsive to the user query. Such a module can include instructions embodied on a non-transitory computer readable storage medium which when loaded into a memory 504 configure processor 502 to carry out the multiple heterogeneous network search. For example, the instructions could implement the logical flow in FIG. 3 to carry out a multiple heterogeneous graph search.

Thus, in some cases, carrying out of the multiple heterogeneous network search includes, as shown at 306, examining, in the relationship network, direct neighbors of a node to which the user query was directed. A further step includes, as shown at 312, responsive to a solution to the query not being found via the examination of the direct neighbors of the node to which the user query was directed, examining, in the network of the different kind than the relationship network, for a node similar to the node to which the user query was directed, to obtain a list of candidate nodes. A still further step 314 includes searching the social network in an extended neighborhood of the node to which the user query was directed to rank the candidate nodes based on closeness.

As noted above, a user query could be directly or indirectly generated by an actual 'user' (human being); an example of indirect generation includes generation by a computer program. Furthermore, the query on the social network (or other network) is not necessarily just on the user's own networks (the one who initiated the query) but also on others' networks (third parties).

In some cases, the relationship network is a social network, and additional steps include step 208, generating the social network based on social data; and steps 214 . . . 222, generating the network of the different kind than the relationship network.

In some embodiments, the network of the different kind than the relationship network is a similarity network 104, 422; and the generating of the network of the different kind than the relationship network includes generating the similarity network from extracted features 212 of a secondary database 204, as seen at 214.

In some cases, the generating of the network of the different kind than the relationship network includes generating the network of the different kind than the relationship network from relational features 220 of a secondary database 206, as seen at 222. The second graph can be relational—actually the features could be in the database—but, in one or more embodiments, is inferred (i.e. based on a computed similarity metric, whatever it might be). The difference is then that one or more embodiments use a mathematical function to extract such a relationship(s). Again, as noted, "first" and "second" are somewhat arbitrary.

Each of the aforementioned method steps can be carried out using a suitable hardware processor; e.g., in a computer, tablet, smart cellular phone, etc.

Exemplary System and Article of Manufacture Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

One or more embodiments of the invention, or elements thereof, can be implemented in the form of an apparatus including a memory and at least one processor that is coupled to the memory and operative to perform exemplary method steps.

Figure 5:
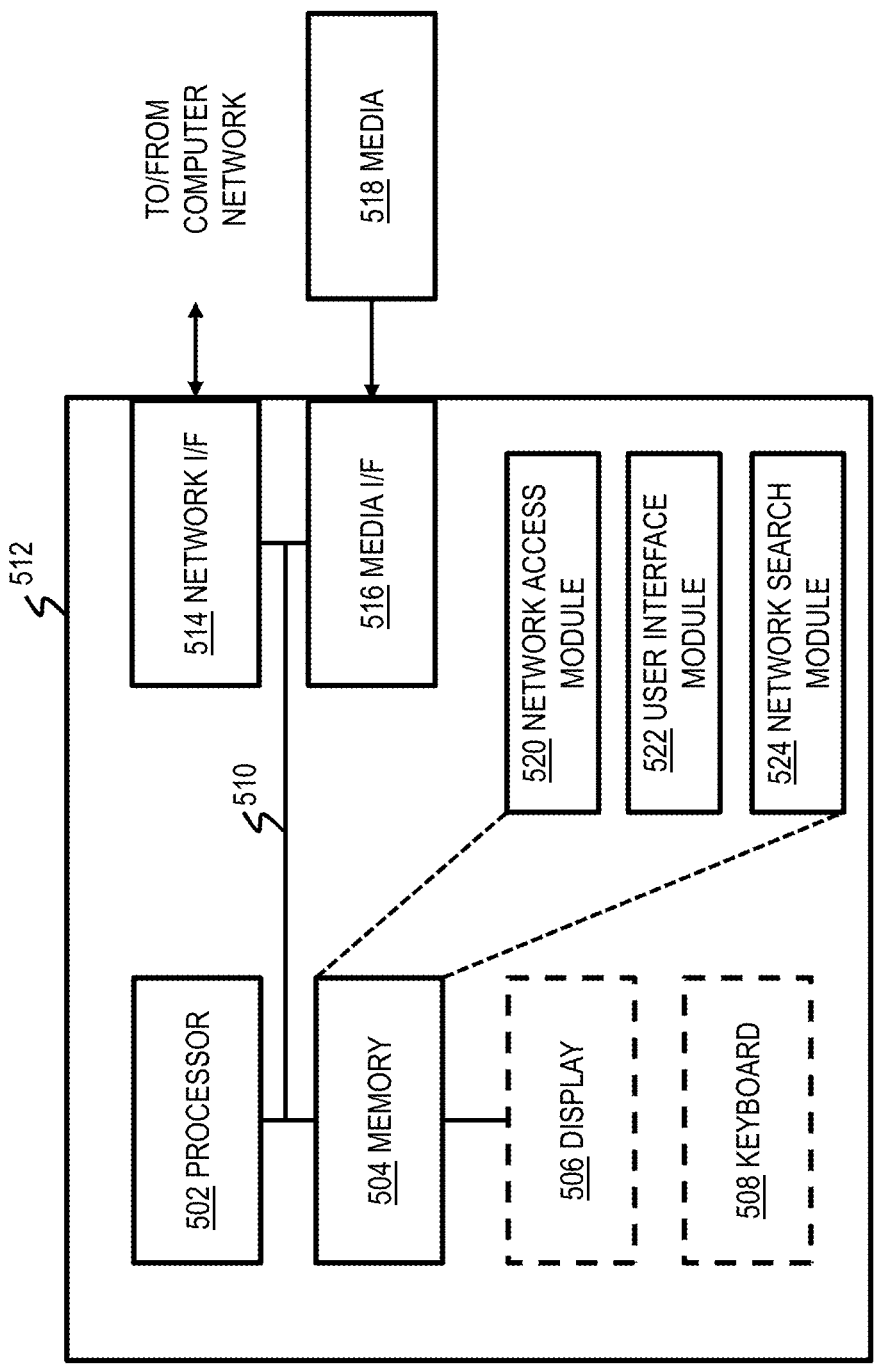
FIG. 5 depicts a computer system that may be useful in implementing one or more aspects and/or elements of the invention.

One or more embodiments can make use of software running on a general purpose computer or workstation; tablet; "smart" phone; or the like. With reference to FIG. 5, such an implementation might employ, for example, a processor 502, a memory 504, and an input/output interface formed, for example, by a display 506 and a keyboard 508. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, one or more mechanisms for inputting data to the processing unit (for example, mouse), and one or more mechanisms for providing results associated with the processing unit (for example, printer). The processor 502, memory 504, and input/output interface such as display 506 and keyboard 508 can be interconnected, for example, via bus 510 as part of a data processing unit 512. Suitable interconnections, for example via bus 510, can also be provided to a network interface 514, such as a network card, which can be provided to interface with a computer network, and to a media interface 516, such as a diskette or CD-ROM drive, which can be provided to interface with media 518. Tablets and "smart" phones may utilize a touch screen for input/output, for example.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 502 coupled directly or indirectly to memory elements 504 through a system bus 510. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 508, displays 506, pointing devices, and the like) can be coupled to the system either directly (such as via bus 510) or through intervening I/O controllers (omitted for clarity).

Network adapters such as network interface 514 may also be coupled to the system to enable the data processing system to become coupled to other data processing systems or remote printers or storage devices through intervening private or public wired or wireless networks. Modems, cable modem and Ethernet cards are just a few of the currently available types of network adapters.

As used herein, including the claims, a "server" includes a physical data processing system (for example, system 512 as shown in FIG. 5) running a server program. It will be understood that such a physical server may or may not include a display and keyboard.

As noted, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. Media block 518 is a non-limiting example. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the elements depicted in the block diagrams and/or described herein; by way of example and not limitation, a network access module 520, a user interface module 522, and a multiple heterogeneous network search module 524. The method steps can then be carried out using the distinct software modules and/or sub-modules of the system, as described above, executing on one or more hardware processors 502. Further, a computer program product can include a computer-readable storage medium with code adapted to be implemented to carry out one or more method steps described herein, including the provision of the system with the distinct software modules. Yet again, as noted above, a user query could be directly or indirectly generated by an actual 'user' (human being); an example of indirect generation includes generation by a computer program. Thus, user interface module 522 may interface directly with a human user or with a computer program that generates the query.

As noted, the multiple heterogeneous network search module 524, can include instructions embodied on a non-transitory computer readable storage medium which when loaded into memory 504 configure processor 502 to carry out the multiple heterogeneous network search. For example, the instructions could implement the logical flow in FIG. 3 to carry out a multiple heterogeneous graph search, by encoding the logic of FIG. 3 in a high-level language and compiling or interpreting same for execution by the at least one processor. The user interface module 522 is programmed to receive user query 210, and optionally to output the results 224. In a client-server architecture, the user interface module could work by serving html code out to a browser on the client machine. In a stand-alone architecture, the user interface module can implement a graphical user interface (GUI) or the like, for example. The network access module 520 can be a conventional database program to access existing networks (here understood to mean data representations of the networks 208, 214, 222), and/or can include the functionality to generate these networks from data 202, 204, 206 as described above.

In any case, it should be understood that the components illustrated herein may be implemented in various forms of hardware, software, or combinations thereof; for example, application specific integrated circuit(s) (ASICS), functional circuitry, one or more appropriately programmed general purpose digital computers with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   obtaining access, by at least one computer processor, to a relationship network;
   obtaining access, by said at least one computer processor, to a similarity network;
   obtaining, by said at least one computer processor, a user query directed to a node in said relationship network; and
   carrying out a multiple heterogeneous networks search combining at least said relationship network and said similarity network, by said at least one computer processor, to obtain a ranked output list responsive to said user query directed to said node in said relationship network;
   wherein said ranked output list comprises at least one node other than said node to which said user query was directed,
   wherein said carrying out of said multiple heterogeneous network search comprises:
   examining, in said relationship network, direct neighbors of said node to which said user query was directed to find a solution to said user query;
   responsive to said solution to said user query not being found via said examination of said direct neighbors of said node to which said user query was directed, examining, in said similarity network, for a node similar to said node to which said user query was directed, to obtain a list of candidate nodes; and
   searching said social network in an extended neighborhood of said node to which said user query was directed to rank said list of candidate nodes based on closeness.

2. The method of claim 1, wherein said relationship network comprises a social network, further comprising:
  generating said social network based on social data; and
  generating said similarity network.

3. The method of claim 2, wherein said similarity network comprises a skill network.

4. The method of claim 2, wherein said generating of said similarity network comprises generating said similarity network from relational features of a secondary database.

5. The method of claim 1, further comprising providing a system, wherein the system comprises distinct software modules, each of the distinct software modules being embodied on a computer-readable storage medium, and wherein the distinct software modules comprise a network access module, a user interface module, and a multiple heterogeneous network search module;
  wherein:
    said obtaining access to said relationship network and similarity network is carried out by said network access module executing on said at least one computer processor;
    said obtaining of said user query is carried out by said user interface module executing on said at least one computer processor; and
    said multiple heterogeneous networks search is carried out by said multiple heterogeneous network search module executing on said at least one computer processor.

6. The method of claim 1, wherein:
  neighboring nodes in said relationship network represent people who have a specified relationship; and
  neighboring nodes in said similarity network represent people who have a specified similarity.

7. A computer program product comprising a non-transitory computer readable storage medium having computer readable program code embodied therewith, said computer readable program code comprising:
  computer readable program code configured to obtain access, by at least one computer processor, to a relationship network;
  computer readable program code configured to obtain access, by said at least one computer processor, to a similarity network;
  computer readable program code configured to obtain, by said at least one computer processor, a user query directed to a node in said relationship network; and
  computer readable program code configured to carry out a multiple heterogeneous networks search combining at least said relationship network and said similarity network, by executing on said at least one computer processor a multiple heterogeneous network search module, to obtain a ranked output list responsive to said user query directed to said node in said relationship network;
  wherein said ranked output list comprises at least one node other than said node to which said user query was directed,
  wherein said computer readable program code configured to carry out said multiple heterogeneous networks search comprises:
    computer readable program code configured to examine, in said relationship network, direct neighbors of said node to which said user query was directed to find a solution to said user query;
    computer readable program code configured to, responsive to said solution to said user query not being found via said examination of said direct neighbors of said node to which said user query was directed, examine, in said similarity network, for a node similar to said node to which said user query was directed, to obtain a list of candidate nodes; and
    computer readable program code configured to search said social network in an extended neighborhood of said node to which said user query was directed to rank said list of candidate nodes based on closeness.

8. The computer program product of claim 7, wherein said relationship network comprises a social network, further comprising:
  computer readable program code configured to generate said social network based on social data; and
  computer readable program code configured to generate said similarity network.

9. The computer program product of claim 8, wherein said similarity network comprises a skill network.

10. The computer program product of claim 8, wherein said computer readable program code configured to generate said similarity network comprises computer readable program code configured to generate said similarity network from relational features of a secondary database.

11. The computer program product of claim 7, wherein a plurality of distinct software modules are embodied on said non-transitory computer-readable storage medium, and wherein the distinct software modules comprise a network access module, a user interface module, and a multiple heterogeneous network search module;
  wherein:
    said network access module comprises said computer readable program code configured to obtain access to said relationship network and said similarity network;
    said user interface module comprises said computer readable program code configured to obtain said user query; and
    said multiple heterogeneous network search module comprises said computer readable program code configured to carry out said multiple heterogeneous networks search.

12. An apparatus comprising:
  a memory; and
  at least one processor, coupled to said memory, and operative to:
    obtain access to a relationship network;
    obtain access to a similarity network;
    obtain a user query directed to a node in said relationship network; and
    carry out a multiple heterogeneous networks search combining at least said relationship network and said similarity network, to obtain a ranked output list responsive to said user query directed to said node in said relationship network;
  wherein said ranked output list comprises at least one node other than said node to which said user query was directed,
  wherein said at least one processor is operative to carry out said multiple heterogeneous networks search by:
    examining, in said relationship network, direct neighbors of said node to which said user query was directed to find a solution to said user query;
    responsive to said solution to said user query not being found via said examination of said direct neighbors of said node to which said user query was directed, examining, in said similarity network, for a node similar to said node to which said user query was directed, to obtain a list of candidate nodes; and searching said social network in an extended neighborhood of said node to which said user query was directed to rank said list of candidate nodes based on closeness.

13. The apparatus of claim 12, wherein said relationship network comprises a social network, and wherein said at least one processor is further operative to:
   generate said social network based on social data; and
   generate said similarity network.

14. The apparatus of claim 13, wherein said similarity network comprises a skill network.

15. The apparatus of claim 13, wherein said at least one processor is further operative to generate said similarity network by generating said similarity network from relational features of a secondary database.

16. The apparatus of claim 12, further comprising a plurality of distinct software modules, each of the distinct software modules being embodied on a computer-readable storage medium, and wherein the distinct software modules comprise a network access module, a user interface module, and a multiple heterogeneous network search module;
   wherein:
   said at least one processor is operative to obtain access to said relationship network and said similarity network by executing said network access module;
   said at least one processor is operative to obtain said user query by executing said user interface module; and
   said at least one processor is operative to carry out said multiple heterogeneous networks search by executing said multiple heterogeneous network search module.

* * * * *